US010795959B2

(12) United States Patent
Price et al.

(10) Patent No.: US 10,795,959 B2
(45) Date of Patent: Oct. 6, 2020

(54) CONVERSION LATENCY REDUCTION IN ONLINE CHAT-BASED COMMUNICATION INFRASTRUCTURE

(71) Applicant: Google LLC, Mountain View, CA (US)

(72) Inventors: Thomas Price, Mountain View, CA (US); Tuna Toksoz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 432 days.

(21) Appl. No.: 15/128,164

(22) PCT Filed: Jun. 1, 2016

(86) PCT No.: PCT/US2016/035328
§ 371 (c)(1),
(2) Date: Sep. 22, 2016

(87) PCT Pub. No.: WO2017/209749
PCT Pub. Date: Dec. 7, 2017

(65) Prior Publication Data
US 2018/0218085 A1 Aug. 2, 2018

(51) Int. Cl.
G06F 40/134 (2020.01)
G06F 16/955 (2019.01)
(Continued)

(52) U.S. Cl.
CPC .......... G06F 16/9558 (2019.01); G06F 16/94 (2019.01); G06F 16/9566 (2019.01);
(Continued)

(58) Field of Classification Search
CPC ............ G06Q 30/0251; G06Q 30/0276; G06F 17/30882; G06F 17/2235; G06F 17/30014;
(Continued)

(56) References Cited

U.S. PATENT DOCUMENTS 7,599,852 B2 10/2009 Bosarge et al.
7,653,627 B2 1/2010 Li et al.
(Continued)

FOREIGN PATENT DOCUMENTS

WO WO-2007/118038 10/2007

OTHER PUBLICATIONS

The International Search Report and The Written Opinion of The International Searching Authority for Application PCT/US2016/035328 dated Jan. 3, 2017.

Primary Examiner — Robert W Beausoliel, Jr.
Assistant Examiner — Pedro J Santos
(74) Attorney, Agent, or Firm — Foley & Lardner LLP

(57) ABSTRACT

The present disclosure is directed to a technique for reducing latency in converting a term in a message to a hyperlink to a content item. The system can receive, from a messaging application executed by a first computing device, a first portion of a message and select a first content item based on the first portion of the message. The system can receive a second portion of the message and select a second content item based on the second portion and the first portion. The system can replace the first content item with the second content item. The system can provide instructions to the messaging application executed by the first computing device to convert a term of the message to a hyperlink for the second content item prior to transmission of the message from the first computing device to the second computing device via the messaging application.

20 Claims, 7 Drawing Sheets

(51) Int. Cl.
*G06F 16/93* (2019.01)
*G06Q 30/02* (2012.01)

(52) U.S. Cl.
CPC ....... *G06F 40/134* (2020.01); *G06Q 30/0251* (2013.01); *G06Q 30/0276* (2013.01)

(58) Field of Classification Search
CPC ........... G06F 17/30887; G06F 16/9558; G06F 16/9566; G06F 16/94
USPC ........................................................ 707/706
See application file for complete search history.

(56) References Cited

U.S. PATENT DOCUMENTS

| | | |
|---|---|---|
| 7,752,074 B2 | 7/2010 | Bosarge et al. |
| 2007/0005563 A1 | 1/2007 | Aravamudan et al. |
| 2009/0112847 A1 | 4/2009 | Sim et al. |
| 2012/0284093 A1 | 11/2012 | Evans |
| 2012/0303445 A1* | 11/2012 | Jablokov ................ G06Q 30/02 705/14.42 |
| 2017/0118152 A1* | 4/2017 | Lee ......................... H04L 51/18 |

* cited by examiner

CONVERSION LATENCY REDUCTION IN ONLINE CHAT-BASED COMMUNICATION INFRASTRUCTURE

RELATED APPLICATIONS

The present application claims priority to and is a national stage of PCT/US2016/035328 filed Jun. 1, 2016, titled "CONVERSION LATENCY REDUCTION IN ONLINE CHAT-BASED COMMUNICATION INFRASTRUCTURE" the entirety of which is hereby incorporated by reference.

BACKGROUND

Information can be displayed in a graphical environment, web pages or other interfaces by a computing device. The graphical environment or web pages can include text, images, video, or audio information provided via an application server or web page server for display on the Internet. Additional content item objects can also be provided by third parties for display on the web pages together with the information provided by the entities. Thus, a person viewing a graphical environment can access the information that is the subject of the web page, as well as selected third party content item objects that may or may not be related to the subject matter of the web page. Due to the large number of available content item objects and the resource intense nature of the electronic graphical environment, it may be challenging to select and provide content item objects for display in the graphical environment.

SUMMARY

The present disclosure provides a technique for reducing latency in converting terms to hyperlinks for content items in online chat-based communication infrastructure. For example, a first instance of a messaging application executing on a first computing device can communicate with a second instance of the messaging application executing on a second computing device. The first and second instances of the chat application can communicate with one another in real-time via a network or a server intermediary to the first and second devices. The first device can receive, via a user interface, an indication of main content (e.g., words or phrases of a text message) to send to the second device. However, due to latency or delays in the communication infrastructure, it may be challenging to select, in real-time, supplemental electronic content based on the main content input at the first device and send the main content and selected supplemental content together to the second device.

The present disclosure can reduce latency when translating, converting, or otherwise manipulating electronic content transmitted and received between two or more computing devices. For example, a data processing system of the present disclosure can translate text or other main content input into a first instance of the chat application executing on the first computing device. The data processing system can receive the main content and initiate a keyword auction using the main content to select supplemental content provided by content providers. The data processing system can convert, append, embed or otherwise combine a hyperlink for the selected supplemental content with the main content. For example, the data processing system can add hyperlinks to specific words in a chat message or text message based on a content provider's keyword bidding. The hyperlinks can lead to supplemental content such as online advertiser content. Thus, the data processing system can transform portions of user-entered text into hyperlinks using a bid-based auction. Content providers can enter bids on the keywords that they would like transformed into hyperlinks to their supplemental content.

In some cases, the present disclosure can augment a conversation between users of a messaging application or a chat application with content related to the conversation. Messaging applications can allow users to conduct conversations by sending text messages over a network such as the Internet. On computing devices such as mobile devices or smartphones, messaging applications can send text messages internationally, thereby reducing fees versus carrier-based text messaging services. Conversations in chat applications can be displayed in a threaded view, showing a user conversation with another user or with a group of other users, e.g., in the form of a linear thread displaying messages in chronological order regardless of reply relationships.

It may be desirable to augment a conversation with content related to the conversation that may either be helpful to the users participating in the conversation or that might otherwise be of interest to the users. Due to the text-driven characteristic of chat applications, however, it is not desired to add supplemental content by displaying additional text within the conversation thread because this would distract users from the actual conversation and make display of the conversation unclear and confusing.

The present disclosure provides a technique for augmenting a conversation between messaging application users with content related to the conversation that may be integrated into a text-driven display mode of messaging applications and which prevents users from being distracted from the actual conversation. In particular, an implementation is desired that allows for augmentation of the conversation in a seamless and efficient manner so that user experience is not affected by the augmentation process being performed.

At least one aspect is directed to a system to reduce latency in online chat-based communication infrastructure. The system can include a data processing system comprising one or more processors and memory. The system can include a content selection component executed by the data processing system. The data processing system can receive, from a messaging application executed by a first computing device, a first one or more terms of a message to be delivered to a second computing device via the messaging application. The data processing system can select a first content item responsive to the first one or more terms. The data processing system can receive a second one or more terms of the message to be delivered to the second computing device via the messaging application. The second one or more terms input to the first computing device subsequent to the first one or more terms input to the computing device. The data processing system can receive the second one or more terms from the messaging application subsequent to selecting the first content item. The data processing system can select a second content item responsive to both the first one or more terms and the second one or more terms. The data processing system can replace the first content item selected responsive to the first one or more terms with the second content item selected responsive to both the first one or more terms and the second one or more terms. The data processing system can provide instructions to the messaging application executed by the first computing device to convert a term of the message to a hyperlink for the second content item prior to transmission of the message from the first computing device to the second computing device via the messaging application, the hyperlink included in the message transmitted to the second computing device.

At least one aspect is directed to a method of reducing latency in online chat-based communication infrastructure. The method can be performed by a content selection component executed by a data processing system comprising one or more processors. The method can include the data processing system receiving, from a messaging application executed by a first computing device, a first one or more terms of a message to be delivered to a second computing device via the messaging application. The method can include the data processing system selecting a first content item responsive to the first one or more terms. The method can include the data processing system receiving, from the messaging application, subsequent to selecting the first content item, a second one or more terms of the message to be delivered to the second computing device via the messaging application. The second one or more terms can be input to the first computing device subsequent to the first one or more terms input to the computing device. The method can include the data processing system selecting a second content item responsive to both the first one or more terms and the second one or more terms. The method can include the data processing system replacing the first content item selected responsive to the first one or more terms with the second content item selected responsive to both the first one or more terms and the second one or more terms. The method can include the data processing system providing instructions to the messaging application executed by the first computing device to convert a term of the message to a hyperlink for the second content item prior to the first computing device transmitting the message to the second computing device via the messaging application, the hyperlink included in the message transmitted to the second computing device.

At least one aspect is directed to a computer-implemented method for augmenting a conversation between messaging application users with content related to the conversation. The method can include parsing a message of the conversation. The method can include identifying one or more keywords in the parsed message. The method can include identifying content related to the one or more identified keywords. The method can include transforming the one or more identified keywords in the message into one or more hyperlinks directing to the identified content.

The parsing the message and identifying the one or more keywords can be performed by a first chat application of a first user. The first chat application can send the one or more identified keywords to a server, wherein identifying the content related to the one or more identified keywords is performed at the server. The server can return one or more hyperlinks directing to the identified content, wherein transforming the one or more identified keywords in the message into the one or more hyperlinks is performed by the first chat application using the one or more hyperlinks returned from the server. Sending the one or more identified keywords to the server can be performed portion-wise upon each completion of a portion of the message as the message is being typed by the first user. Each portion of the message can correspond to a word of the message.

The server can receive a first portion of the one or more identified keywords from the first chat application. The server can identify first content related to the first portion of the one or more identified keywords and returns one or more first hyperlinks directing to the identified first content. The server can receive a second portion of the one or more identified keywords after receiving the first portion of the one or more identified keywords from the first application. The server can identify second content related to the first and second portion of the one or more identified keywords and returns one or more second hyperlinks directing to the identified second content. The one or more second hyperlinks can replace the one or more first hyperlinks returned previously in response to receiving the first portion of the one or more identified keywords.

Transforming the one or more identified keywords in the message into the one or more hyperlinks can be performed by the first chat application each time one or more hyperlinks are returned from the server. The first chat application can transform the one or more hyperlinks upon triggering, by the first user, sending of the message to a second chat application of a second user.

The chat application can filter the one or more identified keywords before sending the one or more identified keywords to the server. The chat application can filter the one or more keywords by cross-referencing a dictionary such that the one or more identified keywords sent to the server only include dictionary words of one or more desired types. The chat application can filter the one or more keywords by cross-referencing a blacklist such that the one or more identified keywords sent to the server only include keywords not included in the blacklist. The chat application can filter the one or more keywords by selecting keywords to be sent to the server based on the number of occurrences in the message such that the one or more identified keywords sent to the server only include keywords with a desired number of occurrences.

The server can identify the content related to the one or more identified keywords by executing a keyword auction based on bids of a plurality of keyword bidders.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
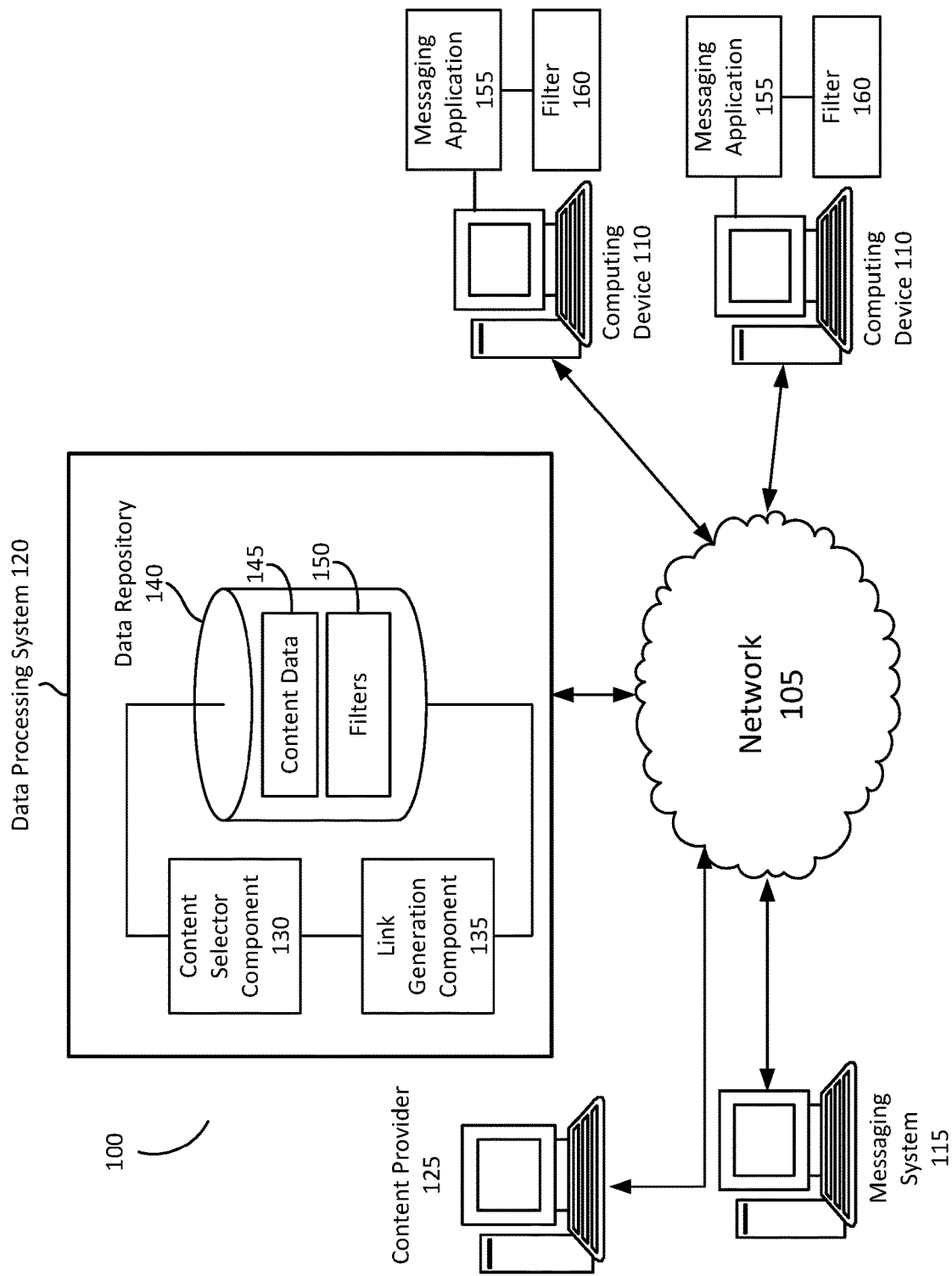
FIG. 1 is an illustration of a system to reduce latency in converting terms to hyperlinks for content items in online chat-based communication infrastructure in accordance with an implementation.

The present disclosure is generally directed to reducing latency in converting portions of a message to a hyperlink for content items. For example, a messaging application or chat application executing on a computing device can receive, via a user interface, a message. This message can include, for example, text, symbols, words, terms, phrases, characters, or strings. The messaging application can send the message to a second computing device via a network. In some cases, the messaging application can send the message to a second computing device via a messaging system or messaging server. Thousands of messages per second may be directed from one computing device to another computing device via the messaging system. Furthermore, selecting and serving content items such as ads is computationally resource intensive from a data processing system perspective because the selection process includes a number of complicated and expensive steps. Thus, the selection process introduces latency in the content selection and serving flow which negatively impacts sending messages from one client computing device to another client computing device.

The present disclosure is generally directed to reducing latency in converting portions of a message to a hyperlink for content items. The systems and methods of the present solution can provide a data processing system configured to facilitate reducing latency in converting terms of an outbound message to a hyperlink to a content item. The systems and methods of the present solution can facilitate maintaining end-to-end encryption of the outbound message. The data processing system can receive portions of the message from a first computing device as the message is typed or otherwise input into the first computing device. For example, a messaging application, chat application, or other component configured on and executed by the first computing device can stream the message to the data processing system as the message is provided to the first computing device. The data processing system can perform a content selection process using the portions of the message streamed to the data processing system. The data processing system can select a content item and identify a term of the message to convert to a hyperlink as the message is being input to the first computing device. The data processing system can provide instructions to the computing device to convert a term to a hyperlink to a selected content item. The data processing system can hold the instructions and provide the instructions upon receiving an indication that the message is complete and ready to be delivered to a second computing device. The data processing system can provide the instructions asynchronously down to the client device as decisions are made, such as as soon as "Let's get pizza" is typed, the data processing system can send an instruction to replace "pizza" with a hyperlink. The instruction may later be superseded by a follow up instruction if the message changes. By receiving a data stream of portions of the message as the message is input to the computing device, and selecting content items based on the received stream, the data processing system can reduce latency in sending a message from a first computing device to a second computing device by selecting content items to link to terms in the message prior to the message being complete for delivery.

For example, a first instance of a chat application executing on a first computing device can communicate with a second instance of the chat application executing on a second computing device. The first and second instances of the chat applications can communicate with one another in real-time via a network or a server intermediary to the first and second devices. For example, the first device can receive, via a user interface, an indication of main content (e.g., words or phrases of a text message) to send to the second device. However, due to latency or delays in the communication infrastructure, it may be challenging to select, in real-time, supplemental electronic content based on the main content input at the first device and send the main content and selected supplemental content together to the second device.

Systems and methods of the present disclosure can reduce latency when translating, converting, or otherwise manipulating electronic content transmitted and received between two or more computing devices. For example, a data processing system of the present disclosure can translate text or other main content input into a first instance of the chat application executing on the first computing device. The data processing system can receive the main content and initiate a keyword auction using the main content to select supplemental content provided by content providers. The data processing system can convert, append, embed or otherwise combine a hyperlink for the selected supplemental content with the main content. For example, the data processing system can add hyperlinks to specific words in a chat message or text message based on a content provider's keyword bidding. The hyperlinks can lead to supplemental content such as online advertiser content. Thus, the data processing system can transform portions of user-entered text into hyperlinks using a bid-based auction. Content providers can enter bids on the keywords that they would like transformed into hyperlinks to their supplemental content.

The data processing system can provide a content selection interface. The data processing system can receive, from content providers via the content selection interface, content selection criteria (e.g., keywords, bids, budgets, geography, device characteristics, or network characteristics) used to select a supplemental content item of the content provider. The data processing system can use the entered content selection criteria to populate a repository of eligible supplemental content items.

The data processing system can receive, from a first computing device, a message entered by a user into the first computing device. For example, a chat application can execute on the first computing device. The chat application can include a module that parses or processes main content, text, messages or other data entered by a user into the chat application to send to a second computing device. The data input to the first computing device to send to a second computing device can be referred to as an outbound message. The chat application, or module thereof, can parse the outbound messages and separate the message into keywords or n-grams (e.g., sets of multiple keywords). The chat application can facilitate streaming keywords to the data processing system as the keywords are entered or input to the first computing device. Streaming the keywords to the data processing system as they are entered into the chat application can facilitate selecting possible content item hyperlinks without affecting the latency of displaying messages at the second computing device.

To reduce latency, the request for content can be generated or occur while a message is typed into the first computing device. For example, the request for content can be provided with each word or set of words sent to the data processing system as the words are input to the first computing device. In this way, the supplemental content item can be requested and provided with the outbound message on the sender's side (e.g., first computing device). The message delivered to the second computing device can already contain a hyperlink to the selected supplemental content.

When parsing the text to generate a request, the chat application can filter the text such that certain terms or words are not provided to the data processing system or otherwise used for content selection. For example, the chat application can apply a filter such that only non-sensitive words and series of words are eligible to be sent to the data processing system and used for content selection. Filtering the text can maintain privacy by keeping subject matter confidential. The chat application can filter the text by using a dictionary. For example, the chat application can cross-reference a dictionary so as to only include dictionary words, rather than any proper nouns, to select content. The chat application can blacklist certain dictionary words that could be considered sensitive. The chat application can use (e.g., instead of or in addition to the blacklist) a whitelist of only approved words, or only of words currently being bid on by content providers, to maintain control over message privacy.

The data processing system can select supplemental content items using an online content selection auction process. The data processing system can take into account the content providers' per-click bid times to determine the predicted likelihood that the user will click on the content item. Thresholds may also be applied such that the data processing system can hyperlink only very high quality content. For example, the data processing system may only provide a hyperlink to content items having a predicted click-through rate above a certain threshold. The data processing system may only convert terms in a text message to a hyperlink if the hyperlinked content item has a click through rate above a threshold. The data processing system can use a long-click rate (e.g., the portion of clicks that linger outside the chat app, indicating that the click was intentional and useful) to predict and act as a threshold.

The data processing system can receive the request for supplemental content while a user is typing a message into the first computing device. For example, the chat application executing on the first computing device can send each word and set of words sent to the data processing system as the message is being typed or input into the first computing device. In this way, the supplemental content item can be requested and attached to the message on the sender's side (first computing device). The delivered message therefore already contains a hyperlink to the content.

The data processing system can measure or monitor the performance of the supplemental content corresponding to the hyperlink in the message. The data processing system can measure the performance either asynchronously within the chat application or with a redirect. The data processing system can indicate to the content provider when links are selected or on a per impression basis.

By streaming portions of a message to a data processing system, and the data processing system selecting content items based on the streamed portions prior to the message being completed and sent, the data processing system can skip the real-time content selection steps after the message is completed, and the chat application executing on the computing device can send the completed, outbound message to the second computing device without having to forward the message to the data processing system to perform content selection. By performing content selection while the message is being typed (e.g., a selection process including an online selection process launched after a portion of a message is input into a client computing device and before a user completes or sends the message to another client computing device), the process of delivering a message that includes a term or keyword converted to a hyperlink to a selected content item (e.g., or is otherwise augmented with a selected content item) can operate faster and the message with the linked content item can be delivered to the destination computing device sooner with reduced delay or latency. Additionally, by configuring a filter on the computing device that parses the portions of the message to block or remove sensitive keywords from being streamed to the data processing system, and by configuring the data processing system to select the content item and provide the hyperlink to the selected content item to the sender computing device for inclusion in the message, the message can be encrypted end-to-end from the sender computing device to the destination device, thereby maintaining a stronger encryption protocol and data security.

FIG. 1 illustrates an example system 100 to reduce latency in converting terms or keywords of a message to hyperlinks for content items. The system 100 can include content selection infrastructure. The system 100 can include a data processing system 120 communicating with one or more of a content provider computing device 125, messaging system 115 or client computing device 110 via a network 105. In some cases, the data processing system 120 may not communicate directly with the messaging system 115 when a message is sent from a first computing device 110 to a second computing device 110. The network 105 can include computer networks such as the Internet, local, wide, metro, or other area networks, intranets, satellite networks, and other communication networks such as voice or data mobile telephone networks. The network 105 can allow a messaging application or online chat application to communicate data or information between two or more computing devices. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access messages or data provided by a messaging system 115. An application 155 (e.g., messaging application or chat application) of the computing device 110 can access a messaging system 115 to retrieve a message or data for display on a monitor of the computing device 110. The messaging system 115 can provide instructions to the application 155 executing on the computing device 110 to render the message or content. The messaging system 115 generally includes an entity that operates message or chat platform. The messaging system 115 may be operated by a third-party entity that is different from an entity that operates the data processing system 120. The messaging system 115 includes at least one server that communicates with the network 105 to communicate messages, texts or other data to one or more computing devices 110. The data processing system 120 can provide instructions to the application 155 executing on the computing device 110 to render content.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the content provider computing device 125 (or provider device 125 or content provider 125), or the messaging system 115. The data processing system 120 can include at least one computation resource, server, processor or memory. For example, the data processing system 120 can include a plurality of computation resources or servers located in at least one data center. The data processing system 120 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The system 100 can include, access, or otherwise interact with at least one messaging system 115. The messaging system 115 can include at least one logic device such as a computing device having a processor to communicate via the network 105, for example with the computing device 110, the data processing system 120, or the content provider 125. The data processing system 120 can include at least one computation resource, server, processor or memory. For example, the messaging system 115 can include a plurality of computation resources or servers located in at least one data center. The messaging system 115 can include one or more component or functionality of the data processing system 120.

The data processing system 120 or messaging system 115 can provide messaging functionality or online chat functionality. For example, the messaging system 115 can provide instant messaging functionality, which can refer to a type of online chat that offers real-time text transmission over network 105. The messaging functionality can include a local area network (LAN) messenger that is designed and configured for use within a single local area network. The messaging system 115 can transmit messages bi-directionally between two computing devices 110 when a user of the computing device provides an indication to send a message (e.g., selects a button on a graphical user interface or a button on an input device). The messaging system 115 can use push technology to transmit messages. The messaging system 115 can provide file transfer, clickable hyperlinks, Voice over IP, or video chat.

The messaging system 115 can provide multicast transmission, such as a chat room or group message or group text. The messaging system 115 can use one or more protocol to transmit messages, including, e.g., peer-to-peer (e.g., direct point-to-point transmission), or client-server (e.g., a central server retransmits messages from the sender to the communication device). For example, if the protocol includes direct point-to-point transmission between two computing devices, the chat applications executing on the respective computing devices 110 can bypass the messaging system 115 and directly transmit messages between the computing devices 110. For example, a protocol can include an eXtensible Messaging and Presence Protocol ("XMPP") that can stream extensible markup language ("XML") elements in order to exchange structured data in close to real time between two network endpoints. The XMPP protocol can transport pieces of data between two endpoints. The pieces of data can be in a structured format, such as XML.

The messaging system 115 can receive messages from a first computing device 110, or a messaging application 155 executing on the first computing device 110. The message or the messaging application 155 can indicate or identify a source identifier of the message, a destination identifier of the message, and the content of the message. The source of the message can include, for example, a username or other identification associated with the first computing device 110 or the messaging application 155 executing on the first computing device. The destination can include a username associated with a second computing device 110 or messaging application 155 executing on the second computing device 110. The messaging system 115 and messaging application 155 can use push or pull technology to transmit and deliver messages.

The data processing system 120 can include a content placement system having at least one computation resource or server. The data processing system 120 can include at least one content selector component 130, at least one link generation component 135, and at least one data repository 140. The at least one data repository 140 can include or store, in one or more data structures or databases, content data 145 and filter data 150. Content data 145 can include, for example, content campaign information, content groups, content selection criteria, content item objects or other information provided by a content provider 125 or obtained or determined by the data processing system to facilitate content selection. The content data 145 can include, for example, historical performance of a content campaign. The content selector component 130 and link generation component 135 can each include at least one processing unit or other logic device such as programmable logic array engine, or module configured to communicate with the database repository or database 140. The content selector component 130, link generation component 135 and data repository 140 can be separate components, a single component, or part of the data processing system 120. The system 100 and its components, such as a data processing system 120, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

A content provider 125 may establish an electronic content campaign. The electronic content campaign can be stored as content data in data repository 140. An electronic content campaign can refer to one or more content groups that correspond to a common theme. A content campaign can include a hierarchical data structure that includes content groups, content item data objects, and content selection criteria. To create a content campaign, content provider 125 can specify values for campaign level parameters of the content campaign. The campaign level parameters can include, for example, a campaign name, a preferred content network for placing content item objects, a budget for the content campaign, start and end dates for the content campaign, a duration for the content campaign, a schedule for content item object placements, language, geographical locations, type of computing devices on which to provide content item objects. Other campaign level parameters can include, for example, a payment technique such as a cost-per-click (CPC), cost per thousand impressions (CPM), cost-per-action (CPA), cost-per-conversion, or cost per thousand conversions. In some cases, an impression can refer to when a content item object is fetched from its source (e.g., data processing system 120 or content provider 125), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the content item object for display on the computing device 110. In some cases, an impression can refer to a viewable impression; e.g., the content item object is at least partially (e.g., 20%, 30%, 30%, 40%, 50%, 60%, 70%, or more) viewable on a display device of the client computing device 110. A click or selection can refer to a user interaction with the content item object, such as a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 125 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or budget.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 125 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 125 can provide one or more keywords and content item objects to each content group. Keywords can include terms that are relevant to the product or services of associated with or identified by the content item objects. A keyword can include one or more terms or phrases. For example, the car dealership may include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords of messages input into a messaging application 155 matching those negative keywords. The content provider can specify a type of matching, such as exact match, phrase match, or broad match, used to select content item objects.

The content provider 125 can provide one or more keywords to be used by the data processing system 120 to select a content item object provided by the content provider 125. The content provider 125 can identify one or more keywords to bid on, and further provide bid amounts for various keywords. The content provider 125 can indicate that a content item object is to be provided with an electronic message input into a messaging application 155 if the electronic message contains the one or more keywords provided by the content provider 125. The content provider 125 can bid on keywords input into an electronic message via a messaging application 155 by a user of a computing device 110.

The content provider 125 can provide additional content selection criteria to be used by the data processing system 120 to select content item objects to be provided with an electronic message input via a messaging application 155 by a user of a computing device 110. For example, the content provider 125 can indicate, via a campaign management user interface provided by the data processing system 120 and accessed by a content provider computing device 125, content selection criteria including a position or placement in the electronic message of the keyword. The campaign management user interface can include inputs for keywords, content item objects, content campaigns, placement of keywords, bid amounts, or a number of links to be provided in an electronic message. Multiple content provider 125 can bid on the same or different keywords, and the data processing system 120 can run a content selection process or ad auction responsive to receiving an indication of a keyword of an electronic message.

The content provider 125 can provide one or more content item objects for selection by the data processing system 120. The data processing system 120 can select the content item objects when a content placement opportunity becomes available that matches the budget, content schedule, maximum bids, keywords, and other selection criteria specified for the content group. Different types of content item objects can be included in a content group, such as a text content item, an image content item, video content item, audio content item, multimedia content item, call content item, or content item link. Upon selecting a content item, the data processing system 120 can generate or provide instructions to generate a hyperlink for the content item. The data processing system 120 can provide instructions to a messaging application 155 executing on a computing device 155 to convert a term of the message into the hyperlink for the selected content item.

The messaging application 155 executing on the computing device 110 can establish a communication session or communication channel with the data processing system 120. The messaging application 155 can establish a different communication session or communication channel with the messaging system 115. The messaging application 155 can establish a secure communication channel with the data processing system 120. The messaging application 155 can provide different information to the data processing system 120 as compared to the messaging system 115 or directly to a destination communication device 110. Thus, the messaging application 155 can establish a first connection or communication session or channel with the data processing system 120, and establish a different, second connection or communication session or channel with the messaging system 115 or directly with a destination computing device 110.

The messaging application 155 can establish a different communication session or channel with the data processing system 120 as compared to the messaging system 115 or a destination computing device 110. For example, the messaging application 155 can stream data to the data processing system 120 for the purposes of content selection, filter the information sent to the data processing system 120, provide requests for content to the data processing system 120, or receive instructions from the data processing system 120.

The messaging application 155 can use push technology to provide real-time text, which can transmit messages character by character or word-by-word, as they are composed in the messaging application 155 by a user of the computing device 110. For example, a user may input text into an input text box of the messaging application or may use a voice interface to input text into the messaging application 155. The messaging application 155 can stream or transmit the inputted text to the data processing system 120 as the text is being input into the messaging application 155. The messaging application 155 can stream the text via the connection or communication channel established between the computing device 110 and the data processing system 120.

The messaging application 155 can include a filter component 160 designed, constructed and configured to filter information associated with the message. The filter component 160 can block certain information from being transmitted to the data processing system 120. For example, the filter component 160 can be configured to remove personally identifying information, names of people, or sensitive information. The filter component 160 can remove sensitive information such that only non-sensitive words and series of words are eligible to be sent to the data processing system 120 for content selection. The filter component 160 can keep the messages confidential. The filter component 160 can remove keywords or terms related to predetermined categories, such as health. To determine whether terms or words are confidential, the filter component 160 can access a dictionary or other repository of terms or words that are deemed to be non-sensitive. The filter component 160 can cross-reference the terms of the message with the terms of the dictionary, and only transmit the term of the message to the data processing system 120 if the term of the message is found in the dictionary (e.g., if the term of the message matches the dictionary or matches a corresponding term in the dictionary, the filter component 160 can determine the term of the message is non-sensitive and eligible to be transmitted to the data processing system 120 for content selection). The filter component 160 can cross-reference the term of the message with a blacklist containing terms that are not to be transmitted. If the filter component 160 identifies a match between a term of the message and the blacklist (or term in the blacklist), the filter component 160 can determine that the term of the message is not eligible to be transmitted to the data processing system 120 for content selection. Thus, the filter component 160 can be configured with a policy or technique to parse the terms of the message in order to prevent, block, or remove one or more terms from being transmitted to the data processing system 120 for content selection, thereby maintaining the confidentiality and security of the messages.

For example, the filter component 160 can parse one or more terms of the message to remove a proper noun of the message prior to transmission of the first one or more terms to the data processing system. The filter component 160 can remove the term if it is a proper noun but it is not a geographic area such as a city, town, county, state, or country. The filter component 160 can remove a term from the message if is a proper noun and it is not a name of a public organization.

The filter component 160 can filter the one or more terms or keywords by selecting keywords based on the number of occurrences in the message such that the one or more identified keywords sent to the data processing system 120 only include keywords with a predetermined number of occurrences. The predetermined number of occurrences can refer to a number of occurrences in the message, in the conversation (e.g., plurality of messages), among a plurality of users or computing devices, or among a plurality of users during a time interval (e.g., 24 hours, 12 hours, 48 hours, 72 hours, or 30 days).

The messaging application 155 can include a module (e.g., filter component 160) that can generate keywords for terms of the message as the terms are entered into the messaging application 155 by a user. The messaging application 155 can transmit the eligible keywords to the data processing system 120 for content selection. For example, a user can input the following message "how about pizza tonight in San Jose?" In some case, the messaging application 155 can apply a filter to remove sensitive terms, and transmit the unfiltered terms (or the terms remaining after the sensitive terms are removed) to the content selector. In some cases, the messaging application 155 can parse the terms in the message and determine that the keywords are "pizza", "tonight" and "San Jose" because pizza corresponds to a topic of interest, tonight corresponds to temporal factor, and San Jose corresponds to a location. The messaging application 155 can determine that terms "how", "about", "tonight" and "in" may not be relevant keywords because they do not correspond to semantic information that can facilitate content selection (e.g., a word of concept that is informative and can be used in an information retrieval system or content selection process, such as what, where, or when). The messaging application 155 can generate, use or access a whitelist of terms that are allowed to be transmitted to the data processing system 120 for content selection. The whitelist can include a list of keywords used by content providers to select content. For example, the messaging application 155 can compare a term in the message with the whitelist to determine if a term of the message matches a term of the whitelist. Responsive to identifying a match between a term of the message and a term of the whitelist, the messaging application 155 can approve or allow the term to be transmitted to the data processing system 120 for content selection. By transmitting terms that match the whitelist, the messaging application 155 can reduce the number of terms that are transmitted to the data processing system 120 while continuing to transmit relevant terms that facilitate contents selection, thereby reducing network bandwidth use and data user, while allowing the data processing system 120 to perform content selection more efficiently by using relevant terms. Furthermore, by only transmitting the relevant terms, the data processing system 120 can select content without the user divulging the content of the messaging being typed.

The messaging application 155 can parse the terms as they are input to the messaging application 155, generate keywords, and transmit or stream the keywords to the data processing system 120. The messaging application 155 can parse the terms as they are input to the messaging application 155, filter the terms, generate keywords, and transmit or stream the keywords to the data processing system 120. The messaging application 155 can parse the terms as they are input to the messaging application 155, filter the terms, and then stream the filtered terms to the data processing system 120.

The messaging application 155 can generate or send requests for content along with streaming or transmitting the keywords or terms to the data processing system 120. The messaging application 155 can generate a request for content for each term, word, or keyword that is streamed or transmitted to the data processing system 120. The messaging application 155 (or filter component 160 thereof) can stitch together one or more terms of the message into a keyword. For example, the messaging application 155 can combine multiple terms or multiple keywords of the message and generate a request for content using the combination of keywords. For example, the messaging application 155 can determine to combine terms "pizza" and "San Jose" into a single keyword phrase "pizza in San Jose", and generate a request for content for the keyword phrase "pizza in San Jose". Thus, the messaging application 155 can determine that one or more keywords are related to one another and that grouping them together can facilitate content selection. In some cases, the content selector 130 executed by the data processing system 120 stitches together terms and combined multiple terms or multiple keywords of the message instead of, or in addition to, the messaging application 155.

The data processing system 120 can include a content selector component 130 designed, constructed, configured or operational to select content items based on the terms or keywords of the message input into the messaging application and streamed to the data processing system 120. The content selector 130 can select a content item for each term or keyword of the message as the term or keyword is streamed to the data processing system 120. The content selector 130 can select one or more content items for each message. The content selector 130 can select one or more content items for a group of messages. The content selector 130 can select a number of content items for each message or a set of messages such that the number of content items does not exceed a threshold. The threshold can be based on a number of terms in the message, a number of terms in a portion of the message, the number of messages, or a time interval. For example, the content selector 130 may select two or fewer content items for a single message such that the number of content items for a single message does not exceed two. For example, the content selector 130 may select not more than one content item for every three terms of a message such that the ratio of content items to terms is ⅓. The content selector 130 can be configured with or use different ratios, such as, e.g., ½, ¼, ⅕, ⅙, or ⅐. The content selector 130 can similarly use a ratio to determine whether to include a content item in a message. For example, the content selector 130 can include one content item for every 1 message, 2 messages, 3 messages, 4 messages, or 5 messages. Thus, the content selector 130 can reduce the number of content items that are selected and provided to the computing device 110. To do so, the content selector 130 can maintain a counter or historical data regarding content items that have been selected and provided to the computing device 110 to determine whether a term in a message is eligible to be converted to a hyperlink to a content item. If no terms in the message are eligible for a content item, the content selector 130 may not select and provide the content item. In some cases, the messaging application 155 can determine whether a term or message is eligible for a content item based on these factors, and determine whether to send a request for content and stream terms or keywords to the data processing system 120.

The content selector component 130 can execute on one or more processors of the data processing system 120 to select a content item based on the received terms or keywords of the message. The content selector component 130 can perform the content selection process prior to the message being complete. For example, the content selector component 130 can perform the content selection process prior to the message transmitted from a first computing device 110 (e.g., source computing device) to a second computing device 110 (e.g., destination computing device 110). By performing the content selection process using terms or keywords streamed to the data processing system 120 prior to the message being completed or prior to the user sending the message, the data processing system 120 can reduce latency or delay in the message being delivered to the destination computing device 110 because the content item selection may already be complete or in the process of being completed by the time the user sends the message, and the message can proceed to be transmitted to the destination computing device 110

The content selector component 130 can use the received or streamed terms or keywords to perform an auction process to select a content item with a highest score. The content selector component 130 can fetch ads while a user types a message. For example, the content selector component 130 can identify one or more content items having content selection criteria that match the streamed keyword. Content providers 125 can bid on content selection criteria, and the content selector component 130 can use the bid to determine a highest scoring or ranking content item. The content selector component 130 can select the highest scoring content item. Content selection criteria can include, e.g., time of day, type of device, geographic location, message portion, topic, vertical, keywords, or profile information. The content selection criteria can take into account long clicks, such as a click that leaves the ad page and does not come back for a long time. A short click can refer to a click that returns to the ad page quickly (e.g., less than 5 minutes, less than 1 minute, less than 10 minutes, less than 30 minutes, less than 1 hour) after the click, which can indicate that the user did not like the web page. The content selector component 130 can attempt to prevent short click since they indicate the user got a bad experience. The click duration may be used as an input to a content selection process that mitigates showing ads that might generate short clicks. Thus, the content selector component 130 can avoid hyperlinking a term to a content item that is not related to the term (e.g., hyperlinking the term "ride" in the message "get a ride" to something unrelated to rides such as a link to a content item that sells or advertises "books").

For example, to select content items to provide in a message, the data processing system 120 can parse the text or terms of the message to identify keywords, and use the keywords to select a matching content item based on a broad match, exact match, or phrase match. For example, the content selector 135 can analyze, parse, or otherwise process subject matter of candidate content items to determine whether the subject matter of the candidate content items correspond to the subject matter of the message. The content selector 135 may identify, analyze, or recognize terms, characters, text, symbols, or images of the candidate content items using an image processing technique, character recognition technique, or database lookup. The candidate content items may include metadata indicative of the subject matter of the candidate content items, in which case the content selector component 130 may process the metadata to determine whether the subject matter of the candidate content item corresponds to the message.

Content providers 125 may provide additional indicators when setting up a content campaign that includes content items. The content provider may provide information at the content campaign or content group level that the content selector component 130 may identify by performing a lookup using information about the candidate content item. For example, the candidate content item may include a unique identifier, which may map to a content group, content campaign, or content provider. The content selector component 130 may determine, based on information stored in content campaign data structure in data repository 155, information about the content provider 125.

The data processing system can include a link generation component 135 that provides the selected content item to the messaging application 155 to provide the selected content item along with the message. When the data processing system 120 (e.g., via the content selector component 130) selects a content item using one or more terms or keywords received from at least a portion of the message, the data processing system 120 (e.g., via link generation component 135) can provide the selected content item to the messaging application 155 for inclusion in the message. The data processing system 120 can augment the message with the selected content item. The data processing system 120 can provide instructions to the messaging application 155 to add, augment, manipulate, or otherwise provide the content item along with the message. For example, the data processing system 120 can provide instructions to the messaging application to convert a term in the message to a link or pointer. The link or pointer can provide access to the selected content item. For example, the link can include a hyperlink, such a link from an electronic document or hypertext file to another electronic location or electronic file that can be activated by clicking on the term. The link can include a link to a web page or landing page corresponding to the content item. The link can include a link to web page associated with a content provider.

In some cases, the link can include a link to an application or resource. For example, the content provider 125 that provided the selected content item can configure the content item to include instructions to launch an application, such as a navigation application, music application, video application, photo application, social media application, or some other application or resource configured to execute on the computing device 110. The link can include instructions for the computing device 110 to perform one or more actions such as, e.g., launch an application, launch a web browser, audio, signal, vibrate, or some other signal.

The content selector component 130 can determine and indicate which term in the message to convert to a link to a content item. For example, the content selector component 130 can receive a first keyword and a first request for content, and select a first content item using the first keyword and responsive to the first request. Prior to the message being completed and sent by the first computing device 110, the content selector component 110 can receive a second keyword and a second request for content. The content selector component 130 can use the first keyword and the second keyword to select a second content item. The content selector component 130 can determine that the second content item is more relevant than the first content item because more information was used to select the content item, such as the first and second keyword as opposed to just the first keyword. Thus, the content selector component 130 may determine to replace the previously selected content item with the selected second content item. The content selector component 130 can, in some cases, determine to provide both content items by converting the first keyword to a link to the first content and converting the second keyword to a link to the second content item. However, to improve the user interface by reducing the amount of links and augmentation, the content selector component 130 can determine to only convert the second keyword to a link for the second content item. In some cases, the content selector component 130 can determine to convert the first keyword to a link for the second content item. For example, the content selector component 130 can determine that the first keyword corresponds to a semantic topic or concept, while the second keyword corresponds to a time or geographic location. The content selector component 130 can determine that the performance of the content item can be improved by converting the term corresponding to the semantic topic to a link instead of the term corresponding to the geographic location. In some cases, the content selector component 130 can compare an ad score (e.g., an ad score based on one or more of a bid amount for the keyword, a predicted click through rate, or predicted conversion rate) for the first content item and the second content item to determine a highest scoring ad, and select the highest scoring ad as the selected content item.

For example, the data processing system 120 can receive, from the messaging application executed by a first computing device, a first one or more terms of a message to be delivered to a second computing device via the messaging application. The data processing system 120 can select a first content item responsive to the first one or more terms. Prior to the user sending the message, the data processing system 120 can receive, from the messaging application, a second one or more terms of the message to be delivered to the second computing device via the messaging application. The second one or more terms can be part of the same message and input to the first computing device subsequent to the first one or more terms input to the computing device. The data processing system 120 can select a second content item responsive to both the first one or more terms and the second one or more terms. The data processing system 120 can replace the first content item selected responsive to the first one or more terms with the second content item selected responsive to both the first one or more terms and the second one or more terms. The data processing system 120 can provide instructions to the messaging application executed by the first computing device to convert a term of the message to a hyperlink for the second content item prior to transmission of the message from the first computing device to the second computing device via the messaging application. The hyperlink can be included in the message transmitted to the second computing device.

In some cases, to improve efficiency and reduce latency in the process, the data processing system can use the first portion of the message (or first keyword thereof) to perform a first content selection process to identify a first plurality of candidate content items. When the data processing system receives the second portion of the message (or second keyword thereof), the data processing system can use the second keyword to perform a second content selection process that selects a content item from the identified first plurality of candidate content items. For example, the second content selection process may be among a subset of content items (e.g., top ranking 100 content items based on the first keyword) as compared to the first content selection process, which may reduce the usage of memory and computation resources, and reduce latency. Thus, the first content selection process can identify a first plurality of candidate content items from among a plurality of content items associated with the data processing system 120, and the second content selection process can select a content item from the first plurality of candidate content items. If the data processing system receives additional portions of the message, the data processing system can continue to use the additional keywords to perform content selection processes among smaller sets (e.g., top 100 content items from on a first selection process based on a first portion of the message, top 50 content items from a second selection process based on a second portion of the message, top 25 content items from a third selection process based on a third portion of the message) of candidate content items. As the number of candidate content items input into the content selection process becomes smaller, the content selection process may become faster and more efficient.

The data processing system 120 can determine which term in the message to convert to a hyperlink to the selected content item using placement criteria associated with the content item. For example, a content provider 125 of the content item can indicate, when setting up the content campaign or content group including the content item, a portion of the message in which to place a hyperlink for the content item. The portion of the message can refer to the first three terms, the last three terms, the middle of the message, a term position in the message (e.g., the $4^{th}$ term, the $2^{nd}$ term), or portions of the message to be avoided (e.g., never the last the term or the first term). To generate instructions to the messaging application 155 to indicate which term of the message to convert to a hyperlink, the data processing system 120 can determine which term to convert to the hyperlink based on the placement criteria established for the selected content item. The data processing system 120 can determine which term to convert to the hyperlink based on the term that was used to select the content item, the term that is determined to be most relevant to the content item (e.g., matching keywords, relevancy score), or the placement criteria for the content item.

Figure 2A:
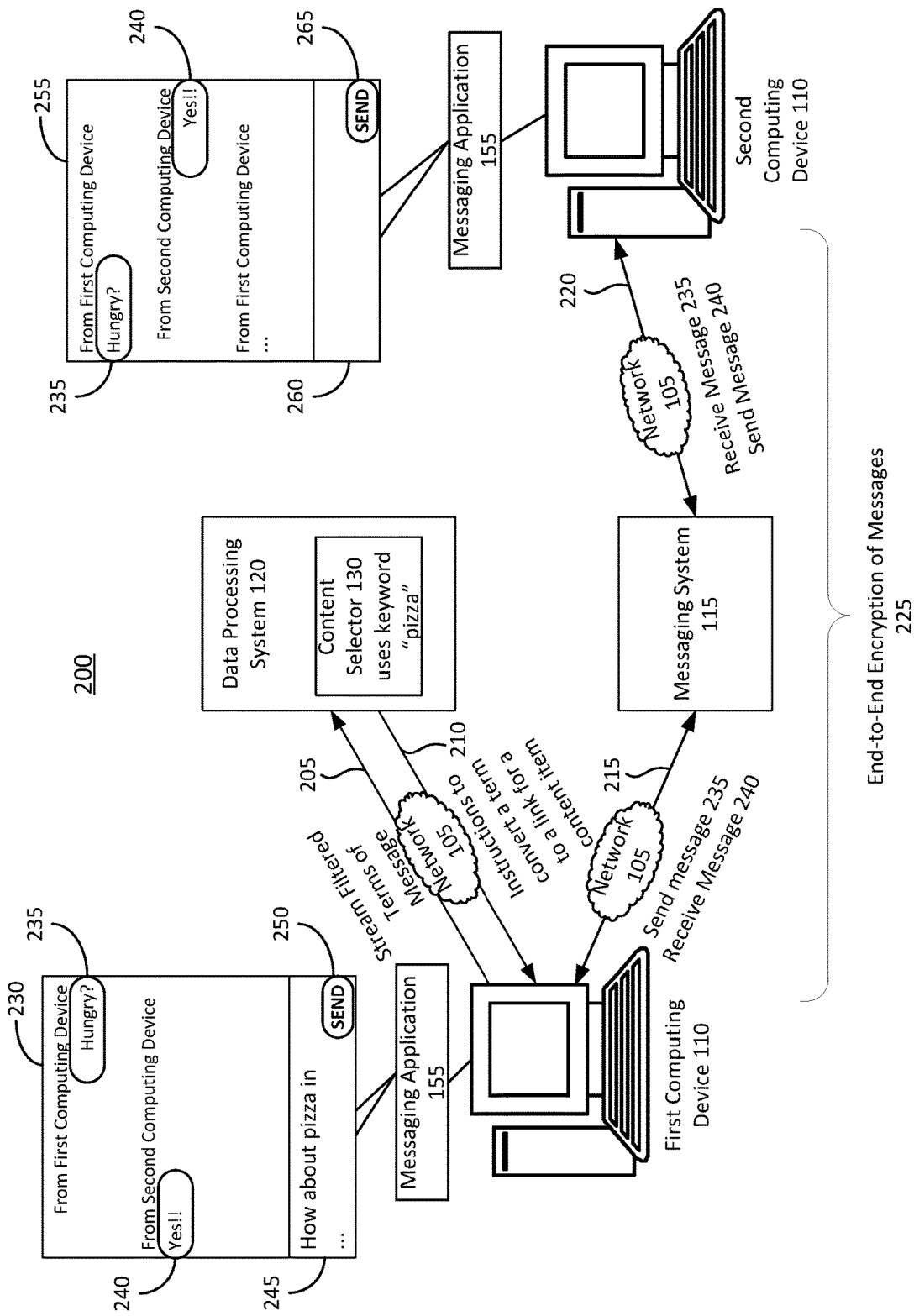
FIG. 2A is a flow diagram illustrating operation of a system to reduce latency in converting terms to hyperlinks for content items in an online chat-based communication infrastructure in accordance with an implementation.

FIG. 2A is a flow diagram illustrating operation of a system to reduce latency in converting terms to hyperlinks for content items in an online chat-based communication infrastructure in accordance with an implementation. The system 200 can include a first computing device 110 that sends electronic messages to a second computing device 110. The first computing device 110 can execute a messaging application 155. A user of the first computing device 110 can input an electronic message into the first computing device 110 via a user interface 230 of the messaging application 155 executed by the first computing device 110. For example, the first computing device 110 can input an electronic message using the input text box 245. When the message is complete or the user is otherwise ready to send the inputted message to the second computing device 110, the user can select a send button 250, or provide any other indication via the user interface 230 to send the message to the second computing device 110. For example, the user of the first computing device 110 can send a message 235 that includes the text "Hungry?" When the user inputs the message 235, the first computing device 110, or messaging application thereof, can send the message 235 at step 215 via network 105 to the messaging system 115. The messaging system 115 can receive the message 235, determine the destination of the message 235, and forward or deliver the message 235 to the second computing device 110 via network 105.

The second computing device 110 can receive message 235 via network 105 and via messaging system 115. The second computing device 110 can execute a messaging application 155 that is a same or different type of messaging application 155 compared to the messaging application 155 executed on the first computing device 110. The messaging applications 115 executed on the first and second computing devices 110 need not be of the same type if they are configured to use standard messaging protocols or include interfaces that are interoperable or can otherwise communicate with one another using a message translation technique. The second computing device 110 can execute the messaging application 110 to provide a user interface 255 for the messaging application via a display screen of the second computing device 110. Thus, when the second computing device 110 receives electronic message 235 via network 105, the second computing device can display electronic message 235 via user interface 255 to a user of the second computing device 110.

The user of the second computing device 110 can respond to the message 235 with another electronic message. For example, the user of the second computing device 110 can input, via the user interface 255, an electronic message 240 that includes the text "Yes!!" The user can input the electronic message 240 using an input text box 260, and can send the message by selecting a send button 265. The second computing device 110 can send the message 240 to the first computing device 110 via network 105 at step 220.

Figure 2B:
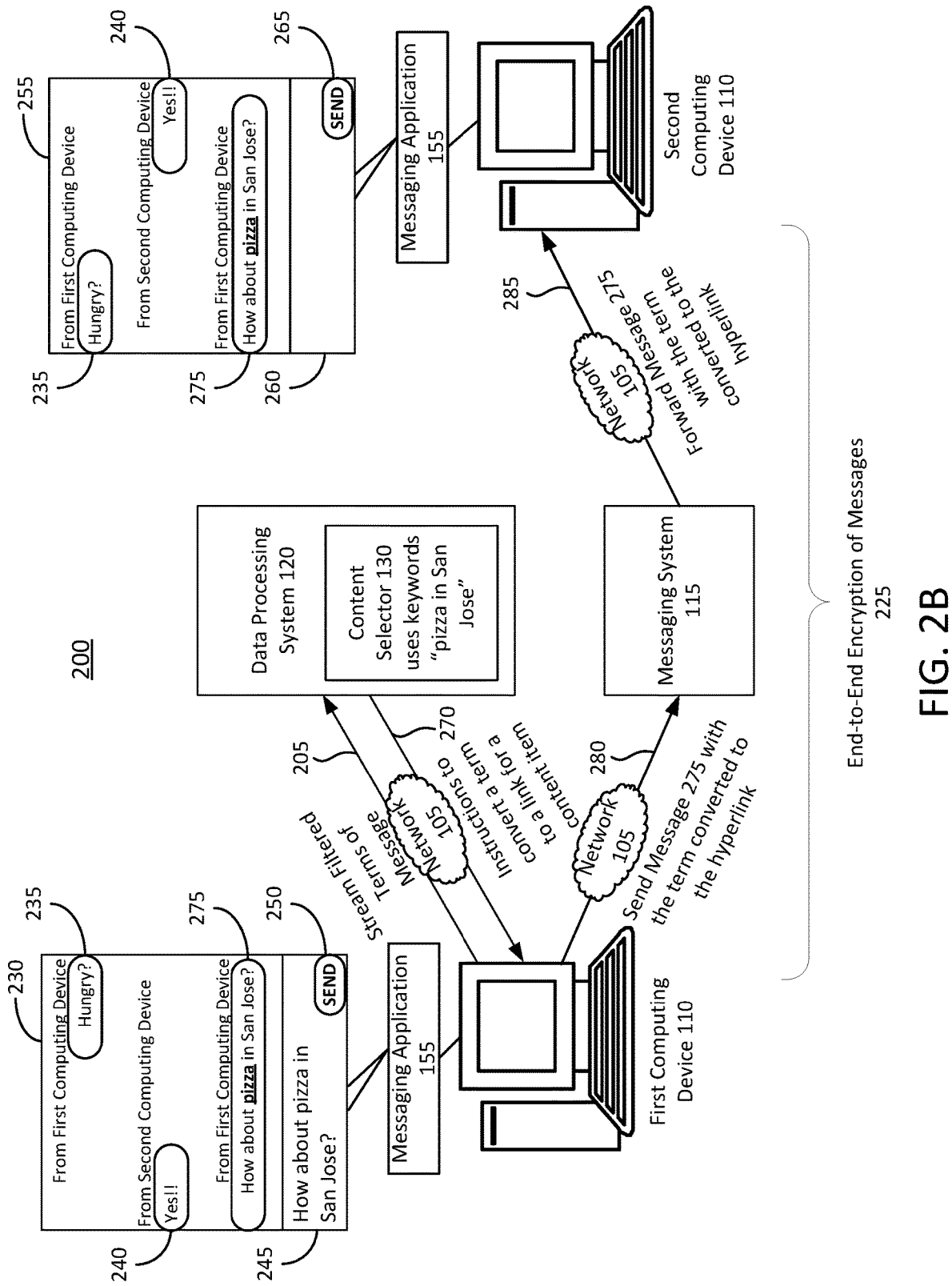
FIG. 2B is a flow diagram illustrating operation of a system to reduce latency in converting terms to hyperlinks for content items in an online chat-based communication infrastructure in accordance with an implementation.

The messaging application 155 can stream messages or portions thereof to a data processing system 120 for content selection. For example, the user of the first computing device 110 can input text into the input text box 245. The user can input text "How about pizza in". This text may not be the complete message that the user intends to send. For example, the complete message can be "How about pizza in San Jose" (as shown in FIG. 2B). The user may be in the process of typing or otherwise inputting the message into the input text box 245 and may not have completed the message. Or the user may have paused while typing the message to determine what to type next. While the user is typing the message, the messaging application 155 executed on the first computing device 110 can stream portions of the message to the data processing system 120. In some cases, the messaging application 155 can filter the message and stream filtered terms of the message via network 105 at step 205. The messaging application 155 can parse the message to generate one or more keywords and forward the one or more keywords to the data processing system 120. For example, the messaging application 155 can parse the entered portion of the message "How about pizza in", apply a sensitivity filter, and convert the entered portion of the text to a keyword "pizza". In this example, the messaging application 155 can cross-reference "pizza" with a dictionary or list of sensitive words to determine that the term "pizza" is a topic or type of food and is eligible for content selection and to be converted to a hyperlink for a content item. The messaging application 155 can transmit the keyword "pizza" at step 205 to the data processing system 120. The messaging application 155 can transmit a request for content along with the keyword.

The data processing system 120 can receive the keyword "pizza" generated based on the first portion of the message input at the first computing device 110. The data processing system 120 can receive a request for content along with the keyword. The data processing system 120 can execute a content selector component 130 to select a content item using the keyword "pizza". The data processing system 120 can select the content item responsive to the request for content and the keyword "pizza". The data processing system 120 can identify a content item using content selection criteria provided by a content provider 125. The data processing system 120 can run an ad auction to select the content item.

Upon selecting the content item using keyword "pizza", the data processing system 120 can either provide instructions to the messaging application 155 or wait to provide instructions until the messaging application receives instructions to send the message to the second computing device. In some cases, the data processing system 120 can, responsive to selecting the content item, provide instructions at step 210 to the messaging application to convert a term or keyword of the message into a link for the selected content item. The instructions can include an indication of the term to convert and a hyperlink (e.g., a uniform resource locator). The messaging application 155 can receive the instructions and store them in a buffer or instruction queue. The data processing system 120 can instruct the messaging application 155 to convert the term to the hyperlink responsive to the user selecting the send button 250.

However, if the message is not complete, the data processing system can receive a second portion of the message. The data processing system 120 can receive the second portion after the first portion because the message is being streamed to the data processing system 120 as the message is input to the first computing device 110. When the data processing system 120 receives the second portion of the message, the content selection process for the first keyword may already be in progress or complete. When the data processing system 120 receives the second portion of the message, the data processing system 120 may have already provided instructions to the first computing device 110 to convert a term to a hyperlink for the content item selected using the first portion of the message or keyword thereof.

FIG. 2B is a flow diagram illustrating operation of a system to reduce latency in converting terms to hyperlinks for content items in an online chat-based communication infrastructure in accordance with an implementation. The system 200 illustrated in FIG. 2B can be similar to system 200 illustrated in FIG. 2A. As shown in FIG. 2B, the user has entered a second portion of the message into input text box 245. The first portion of the message was "How about pizza in". The " . . . " in FIG. 2A indicated that the message was not yet completed and the user was still typing or had not yet selected the send button. In FIG. 2B, the second portion of the message has been entered in text box 245 as "San Jose?" Thus, the complete message can be "How about pizza in San Jose?" as shown in input text box 245. The messaging application 155 can stream the second portion of the message to the data processing system 120 for content selection. The messaging application 155 can parse the second portion to identify a second term or generate a second keyword, such as "San Jose". The messaging application 155 can apply a filter to remove any non-sensitive words and generate the keyword. In this example, the messaging application 155 can cross-reference "San Jose" with a dictionary or list of sensitive words to determine that the term "San Jose" is a geographic area and is eligible for content selection and to be converted to a hyperlink for a content item. In some cases, the messaging application 155 may only stream the second keyword to the data processing system 120. In some cases, the messaging application 155 may stream both the first keyword "pizza" and the second keyword "San Jose". In some cases, the messaging application 155 can combine or stitch together the first keyword and the second keyword to generate a third keyword or keyword phrase "pizza in San Jose". In some cases, the data processing system 120 can combine or stitch together the first keyword and the second keyword (or a number of previous terms) to generate a third keyword or keyword phrase "pizza in San Jose".

The data processing system 120 can receive the second keyword "San Jose" or "pizza in San Jose". The data processing system 120 can receive a second request for content based on the second term or keyword "San Jose".

The data processing system 120 (e.g., via content selector component 130) can select a second content item using the second keyword (e.g., or both the first keyword and the second keyword; or both the first one or more terms and the second one or more terms). The second content selection process can result in a second content item. The second content item can be different from the first content item. For example, the first content item can be for a pizza restaurant in Santa Clara because the keyword was "pizza" and did not indicate a geographic area. The second content item may be for a pizza restaurant in San Jose because the second keyword includes the geographic area "San Jose". Thus, the second content item may be more relevant to the complete message than the first content item.

The data processing system 120 can, upon selecting the second content item, send instructions to the messaging application 155 to convert a term of the message to a hyperlink for the second content item at step 270. The data processing system 120 can send instructions to replace the first content item with the second content item if the data processing system 120 already sent instructions for the first content item. If the data processing system 120 did not yet send instructions, the data processing system 120 can replace the first content item with the second content item and wait till the user selects the send button to transmit instructions to convert a term to the hyperlink for the second content item.

The data processing system 120 can send a first set of instructions to convert a first term of the electronic message to a hyperlink for the first content item, and send a second set of instructions to convert a second term of the electronic message to a hyperlink for the second content item. In some cases, the data processing system 120 can determine, based on the number of terms in the message or the number of terms separating the keywords eligible for conversion, that the message is not eligible for two links to content items. Thus, the data processing system 120 can send instructions to negate the first set of instructions for the first hyperlink, and send instructions to convert the term to a hyperlink to the second content item.

Thus, as each word of the message is typed, the data processing system 120 may do nothing (e.g., if the term is removed out by a filter), generate a link to a content item, or update a previous link to a new content item.

As illustrated in FIG. 2B, after the send button 250 is selected, the messaging application can send electronic message 275 with a term converted to a hyperlink for a content item at step 285. The messaging application 155 can display the electronic message 275 with the term converted to a hyperlink in the user interface 230. The messaging application 155 can illustrate the hyperlink as using a different font, format, or color. For example, the hyperlinked term can be underlined or bolded. In this example, the term "pizza" is converted to a hyperlink and is bolded and underlined as follows pizza. The messaging application 155 can send the message 275 with the term converted to the hyperlink for the content item at step 280 via network 105. The messaging application 155 can send the electronic message 275 to messaging system 115, and messaging system 115 can forward the message 275 to the second computing device 110. The second computing device 110 can display the message 275 with the hyperlinked term on the user interface 255. By configuring the system 200 with a data processing system 120 that receives filtered keywords from the first computing device and sends instructions to the first computing device, the system 200 can provide end-to-end encryption 225 of messages transmitted between the first computing device and the second computing device while reducing latency in augmenting electronic messages with content items. End-to-end encryption 225 can result from injecting the link to the content item on the sender computing device 110. End-to-end encryption 225 can refer to the messaging system 115 (or messaging server 115) delivering an encrypted message or data packet to the recipient computing device 110. It can be referred to end-to-end encryption 225 because the messaging system 115 may not have the authority or ability to decrypt the message itself (e.g., the messaging system 115 may not have the right key to decrypt the message). Thus, the data processing system 120 can provide the sender computing device 110 with instructions to embed a link to a content item into a message before the sender computing device 110 encrypts the message. The sender computing device 110 can encrypt the message with the embedded link, send the encrypted message to the messaging system 115, and the messaging system 115 can forward the encrypted message that includes the link to the content item.

Figure 3:
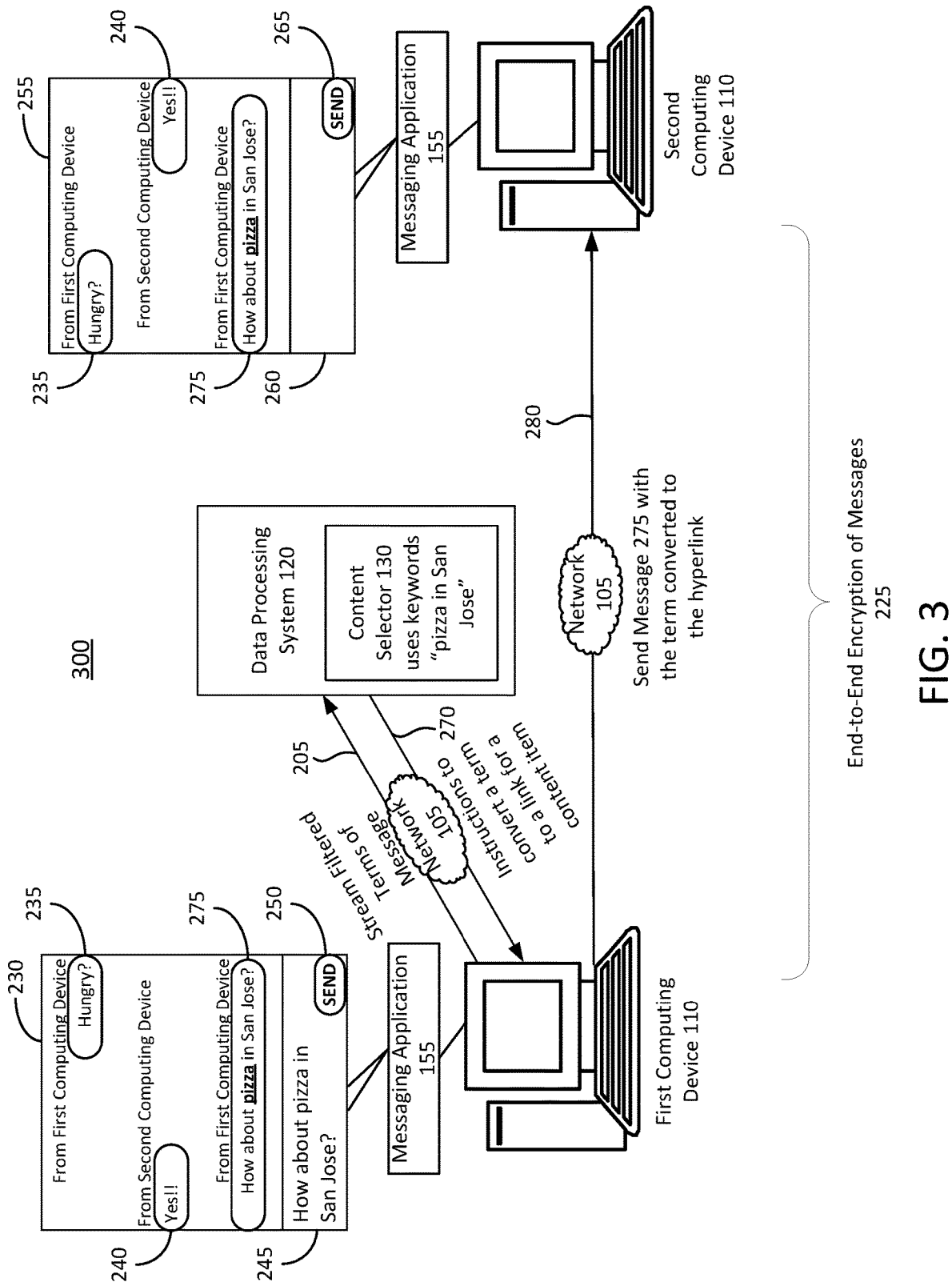
FIG. 3 is a flow diagram illustrating operation of a system to reduce latency in converting terms to hyperlinks for content items in an online chat-based communication infrastructure in accordance with an implementation.

FIG. 3 is a flow diagram illustrating operation of a system to reduce latency in converting terms to hyperlinks for content items in an online chat-based communication infrastructure in accordance with an implementation. As shown in FIG. 3, system 300 may not include a messaging system 115 intermediate to the first computing device 110 and the second computing device 110. For example, electronic messages can be sent directly at step 280 from the first computing device 110 to the second computing device 110 via a peer-to-peer connection, LAN network, BlueTooth, peer-to-peer WIFI, or other connection via a network 105 that may not include a messaging system 115. However, since the data processing system 120 interacts directly with the first computing device 110 and sends instructions to the first computing device 110 to convert terms to hyperlinks, the message 275 can be sent to the second computing device 110 directly with a term converted to a hyperlink for a content item selected by the data processing system 120. Thus, systems and methods of the present disclosure can reduce latency in augmenting electronic messages with content items while preserving the ability for secure, end-to-end encryption 225 of messages between the first computing device and the second computing device.

Figure 4:
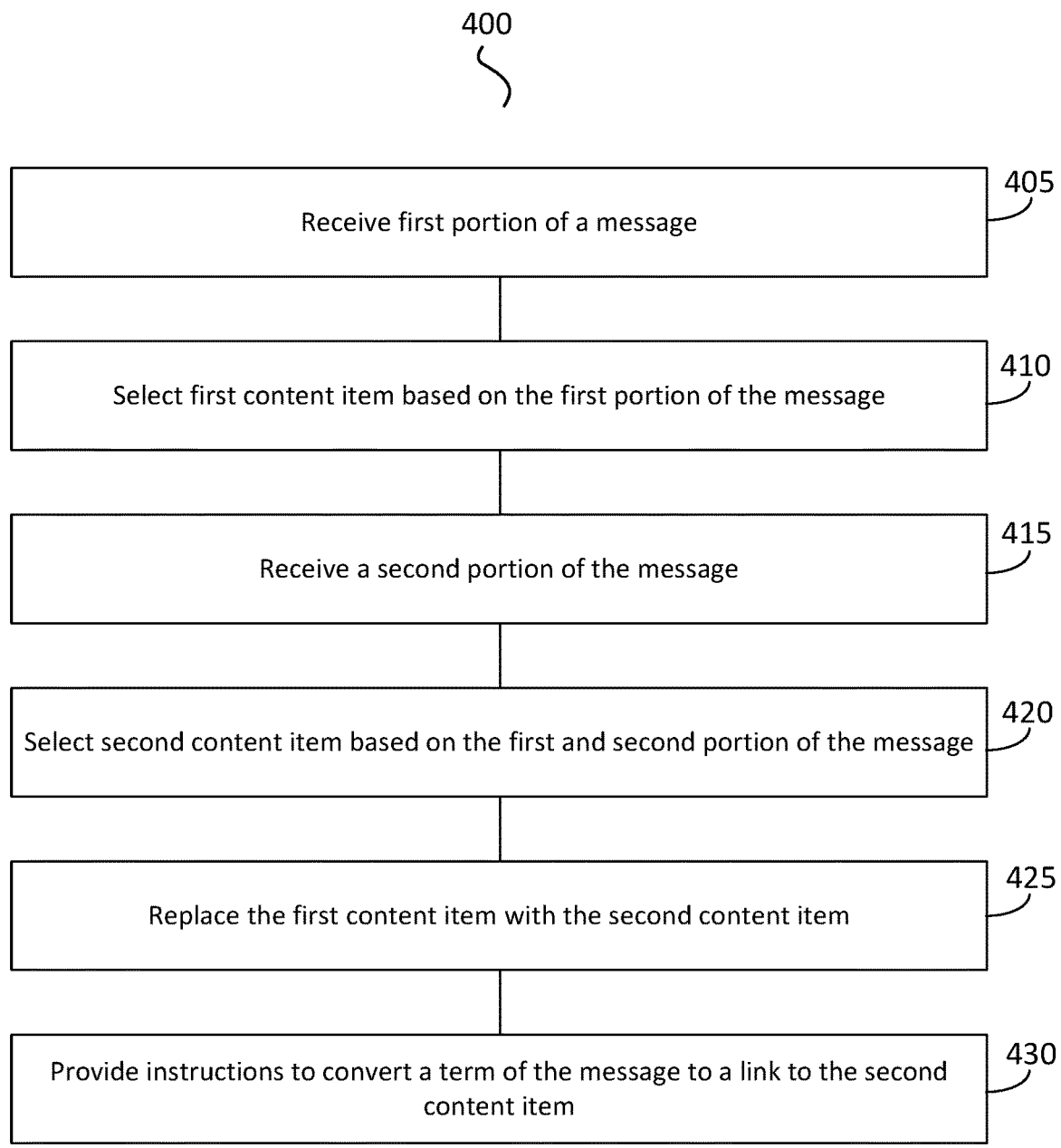
FIG. 4 is an illustration of a method for reducing latency in converting terms to hyperlinks for content items in online chat-based communication infrastructure in accordance with an implementation.

FIG. 4 is an illustration of a method for reducing latency in converting terms to hyperlinks for content items in online chat-based communication infrastructure in accordance with an implementation. The method 400 can be performed via one or more system or component illustrated in FIG. 1, FIG. 2A, FIG. 2B, FIG. 3, or FIG. 6, including, e.g., a data processing system, content selector component, link generation component, data repository, messaging system, content provider, content publisher, network, computing device, or computation resource. At act 405, a data processing system can receive a first portion of a message. At act 410, a data processing system can select a first content item based on the first portion of the message. At act 415, a data processing system can receive a second portion of the message. At act 420, the data processing system can select a second content item based on the first and second portions of the message. At act 425, the data processing system can replace the first content item with the second content item. At act 430, the data processing system can provide instructions to convert a term of the message to a link to the second content item.

Still referring to FIG. 4, and in further detail, a data processing system can receive a first portion of a message at act 405. For example, a content selector component executed by the data processing system can receive, from a messaging application executed by a first computing device (or source computing device or sender computing device), a first one or more terms of a message to be delivered to a second computing device via the messaging application. The terms of the message can be streamed to the data processing system as the message is input into the first computing device. The terms can be parsed or filtered prior to sending to the data processing system. For example, the messaging application can filter the terms to remove any sensitive terms or for privacy purposes. The messaging application can apply a threshold to send a minimum or maximum number of terms in a transmission (e.g., 3 terms per transmission, 2 terms, 1 term, 4 terms, or 5 terms). The messaging application can stream the terms using a data stream. The messaging application can establish a connection with the data processing system as terms are input to the messaging application, or upon the messaging application being launched on the first computing device. The messaging application can provide a prompt to the first computing device to establish the connection.

The messaging application can parse the terms of the message to generate a keyword. Responsive to generating or identifying the keyword, the messaging application can transmit the keyword to the data processing system. One or more terms of the portion of the message input into the messaging application may correspond to a keyword, while one or more terms may not correspond to a keyword. For example, the messaging application can parse the text "how about pizza in". This text includes four terms. The messaging application can parse the text to identify or generate a keyword "pizza". The messaging application may only transmit the keyword "pizza" to the data processing system, as opposed to the full text of the portion of the message. In some cases, the messaging application may stream the entire text as the text is input, and the data processing system can parse the text to identify a keyword.

At act 410, a data processing system can select a first content item based on the first portion of the message. The data processing system can select the first content item based on a keyword that corresponds to the first portion of the message. The data processing system can input the keyword into an ad auction to identify a highest ranking content item in the ad auction, and select this content item as the first content item.

Upon selecting the first content item, the data processing system can enter standby mode until further portions of the message are received or an indication to send the message (or the message is complete) is received. In some cases, the data processing system can provide instructions to the first computing device to provide the first content item responsive to selecting the first content item, and prior to receiving an indication that the message is complete or the message is ready to be sent.

At act 415, a data processing system can receive a second portion of the message. The second portion of the message can be streamed to the data processing system similar to the first portion of the message. In some cases, the messaging application 155 can combine a keyword of the first portion with a keyword of the second portion and send a combined keyword or a keyword phrase. The data processing system can assemble the first one or more terms and the second one or more terms into a keyword (e.g., use a semantic analyzer to assemble "pizza" and "San Jose" into "pizza in San Jose"). The messaging application 155 can parse or filter the second portion prior to transmitting terms of the second portion or generating a keyword for the second portion. The data processing system can receive the second portion of the message (or keyword thereof) after commencing content selection using the first portion of the message, or after completing content selection for the first portion, or after providing instructions to the computing device to provide the first selected content item.

At act 420, the data processing system can select a second content item based on the first and second portions of the message. The data processing system can input the first keyword of the first portion and the second keyword of the second portion into a content selection process to identify a second content item that matches both the first and second keywords (or first and second portions of the message). The second content item can be different from the first content item.

The first content selection process and the second content selection process can be similar, but with different inputs. For example, in the first content selection process, the input can include a first keyword based on the first portion of the message and a first plurality of content items. The data processing system can perform the first content selection process to identify a second plurality of content items that is a subset of the first plurality of content items. The second plurality of content items can correspond to top ranking content items (e.g., top 1000, top 10,000, top 500, top 100, top 50, top 20, top 10, top 5, top 3 or other predetermined number) of the first plurality of content items based on the first keyword. The second plurality of content items can include a highest ranking content item that can be provided to the first computing device to include with the electronic message. If additional portions of the message or additional keywords based on additional portions of the message are received, the data processing system can perform a second content selection process using the second plurality of content items to identify a third plurality of content items that is a subset of the second plurality of content items. The third plurality of content items can correspond to top ranking content items (e.g., top 1000, top 10,000, top 500, top 100, top 50, top 20, top 10, top 5, top 3 or other predetermined number) of the second plurality of content items based on the second keyword. The data processing system can identify a highest ranking content item of the third plurality of content items. The highest ranking content item of the third plurality of content items can be the same as or different from the highest ranking content item of the second plurality of content items based on the second keyword. As subsequent keywords are received by the data processing system for the electronic message, the data processing system can use the subsequent keyword to perform a subsequent content selection process using the subset of content items identified from a previous content selection process. By using subsequent subsets of content items as input into the content selection process, where a subsequent subset is smaller than a previous subset, the data processing system can reduce resource utilization, improve efficiency, and reduce latency in augmenting electronic messages with content items.

At act 425, the data processing system can replace the first content item with the second content item. The data processing system can replace the first content item selected responsive to the first one or more terms with the second content item selected responsive to both the first one or more terms and the second one or more terms. The data processing system can send instructions to the first computing device to negate previous instructions regarding a first content item.

At act 430, the data processing system can provide instructions to convert a term of the message to a link to the second content item. The data processing system can provide instructions to the messaging application executed by the first computing device to convert a term of the message to a hyperlink for the second content item prior to the first computing device transmitting the message to the second computing device via the messaging application. The hyperlink (or instructions thereof) can be included in the message transmitted to the second computing device.

To select the term to convert, the data processing system can access a content data repository to retrieve placement criteria for the selected content item. The placement criteria can indicate a portion of the message in which to place the hyperlink for the content item. The data processing system can select the term of the message to convert to the hyperlink based on the portion of the message in which the term is positioned. For example, the placement criteria can indicate to convert a term that is positioned in the second half of the message; or convert a term that is positioned in the last three terms of the message; or not to convert a term that is positioned in the first three terms in the message. The data processing system can use the placement criteria for the content item to select which term to convert. For example, there are two keywords in the message "how about pizza in San Jose". The two keywords are "pizza" and "San Jose". The data processing system may initially determine that these two keywords are eligible for conversion to a link to a content item. Using the placement criteria, the data processing system can select one of these terms to convert. For example, the placement criteria can indicate to convert a term in the first half of the message. In this example, the first half of the message includes terms "how about pizza", which includes eligible keyword "pizza". Thus, the data processing system can convert the term pizza into a hyperlink for the content item.

In some cases, the data processing system can receive, from the messaging application, subsequent to selecting the second content item, a third one or more terms of the message to be delivered to the second computing device via the messaging application. The third one or more terms can be input to the first computing device subsequent to the second one or more terms input to the computing device. For example, the electronic message can be "how about pizza in San Jose after the movie?" The first portion streamed to the data processing system can be "how about pizza"; the second portion streamed to the data processing system can be "San Jose" and the third portion streamed to the data processing system can be "after the movie". The data processing system can generate one or more keywords based on the first one or more terms (e.g., keyword pizza), the second one or more terms (e.g., keyword San Jose), and the third one or more terms (e.g., keyword movie). The data processing system can select a third content item responsive to the one or more keywords (e.g., pizza, San Jose, movie). The data processing system can provide to the first computing device for input into the message delivered to the second computing device via the messaging application, instructions to convert a second term to a second hyperlink for the third content item. For example, the second term can be "movie" and the third content item can be tickets for a movie playing in San Jose, a ticket seller website, or a name of a movie currently playing in a theater in San Jose. Thus, the data processing system can determine to augment the electronic message with two content items. In some cases, the messaging application can determine to remove one of the links (e.g., a user can input preferences corresponding to a number of links to provide per electronic message, per a number of messages, or during a time interval).

The data processing system can retrieve placement information for the third content item. For example, the data processing system can retrieve from a content data repository, a placement criteria for the third content item. The placement criteria can indicate a portion of the message in which to place the second hyperlink for the third content item. The placement can correspond to the same placement as a previously selected content item. The data processing system can determine not to replace the previously selected content item. For example, the data processing system can determine that the first term or keyword being converted to a link to the second content item is not to be replaced with a link to the third content item (e.g., higher ad score, more relevant ad, or higher bid price). The data processing system can determine not to provide instructions to convert a second term to the second hyperlink for the third content item based on the first term converted into the hyperlink being in the portion of the message corresponding to the placement criteria for the third content item. Thus, the data processing system can prioritize the second content item over the third content item based on one or more factors (e.g., relevancy, likelihood of interest, predicted click through rate, predicted conversion rate), and determine not to provide instructions to replace the content item.

Figure 5:
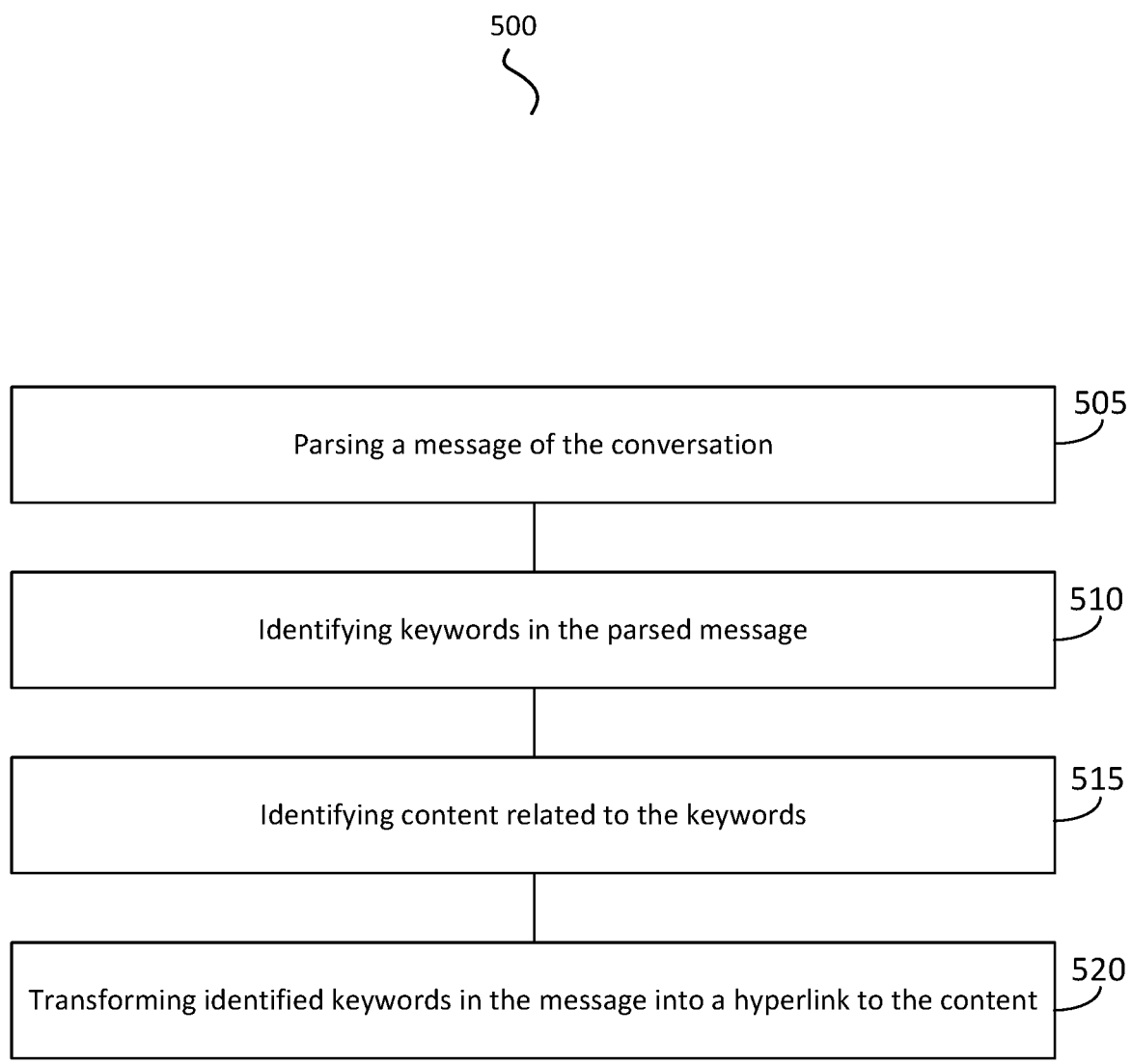
FIG. 5 is an illustration of a method for reducing latency in converting terms to hyperlinks for content items in online chat-based communication infrastructure in accordance with an implementation.

FIG. 5 is an illustration of a method for reducing latency in converting terms to hyperlinks for content items in online chat-based communication infrastructure in accordance with an implementation. The method 500 can include a computer-implemented method for augmenting a conversation between messaging application users with content related to the conversation. The method 500 can be performed via one or more system or component illustrated in FIG. 1, FIG. 2A, FIG. 2B, FIG. 3, or FIG. 6, including, e.g., a data processing system, content selector component, link generation component, data repository, messaging system, content provider, content publisher, network, computing device, or computation resource. At act 505, a message of a conversation can be parsed. At act 510, keywords in the parsed message can be identified. At act 515, content related to the keywords can be identified. At act 520, the identified keywords in the message can be transformed into a hyperlink to the content.

At act 505, a message of a conversation can be parsed. For example, a first messaging application of a first user can parse the message of the conversation as the message is input into a user interface. A conversation can refer to one or more messages transmitted between two or more computing devices. The messages of the conversation can be related in time, content, computing devices, topics, or usernames.

At act 510, keywords in the parsed message can be identified. The first messaging application can send the one or more identified keywords to a server. The first messaging application can identify the keywords portion-wise, such as upon each completion of a portion of the message as the message is being typed by the first user. Each portion of the message can correspond to a word of the message (or a predetermined number of words of the message).

The first messaging application can filter the one or more identified keywords by the first messaging application before sending the one or more identified keywords to the server. For example, the first messaging application can filter the keywords by removing sensitive keywords, confidential keywords, proper nouns or other information. For example, the first messaging application can filter the one or more identified keywords by cross-referencing a dictionary such that the one or more identified keywords sent to the server only include dictionary words of one or more desired types (e.g., nouns, topics, concepts, geographic areas, or temporal indicators). The first messaging application can filter the one or more identified keywords by cross-referencing a blacklist such that the one or more identified keywords sent to the server only include keywords not included in the blacklist. The blacklist can be predetermined, established by an administrator of the server, data processing system, or a user of the application. The first messaging application can filter the one or more identified keywords by selecting keywords based on the number of occurrences in the message such that the one or more identified keywords sent to the server only include keywords with a desired number of occurrences. The desired number of occurrences can refer to a desired number of occurrences in the message, in the conversations (e.g., plurality of messages), among a plurality of users, or among a plurality of users during a time interval (e.g., 24 hours, 12 hours, 48 hours, 72 hours, or 30 days).

At act 515, content related to the keywords can be identified. The server can identify the content related to the identified keywords by executing a keyword auction based on bids of a plurality of keyword bidders. For example, the server can receive a first portion of the one or more identified keywords from the first messaging application to the server identifies first content related to the first portion of the one or more identified keywords and returns one or more first hyperlinks directing to the identified first content.

The server can receive a second portion of the one or more identified keywords after receiving the first portion of the one or more identified keywords from the first application. The server can identify second content related to the first and second portions of the one or more identified keywords and return one or more second hyperlinks directing to the identified second content. The one or more second hyperlinks can replace the one or more first hyperlinks returned previously in response to receiving the first portion of the one or more identified keywords.

At act 520, the identified keywords in the message can be transformed into a hyperlink to the content. The first messaging application can transform the one or more identified keywords in the message into the one or more hyperlinks each time one or more hyperlinks are returned from the server. The first messaging application can transform the one or more identified keywords in the message into the one or more hyperlinks responsive to a first user of the first application triggering sending of the message to a second messaging application of a second user.

The server can return one or more hyperlinks directing to the identified content, wherein transforming the one or more identified keywords in the message into the one or more hyperlinks is performed by the first messaging application using the one or more hyperlinks returned from the server.

Figure 6:
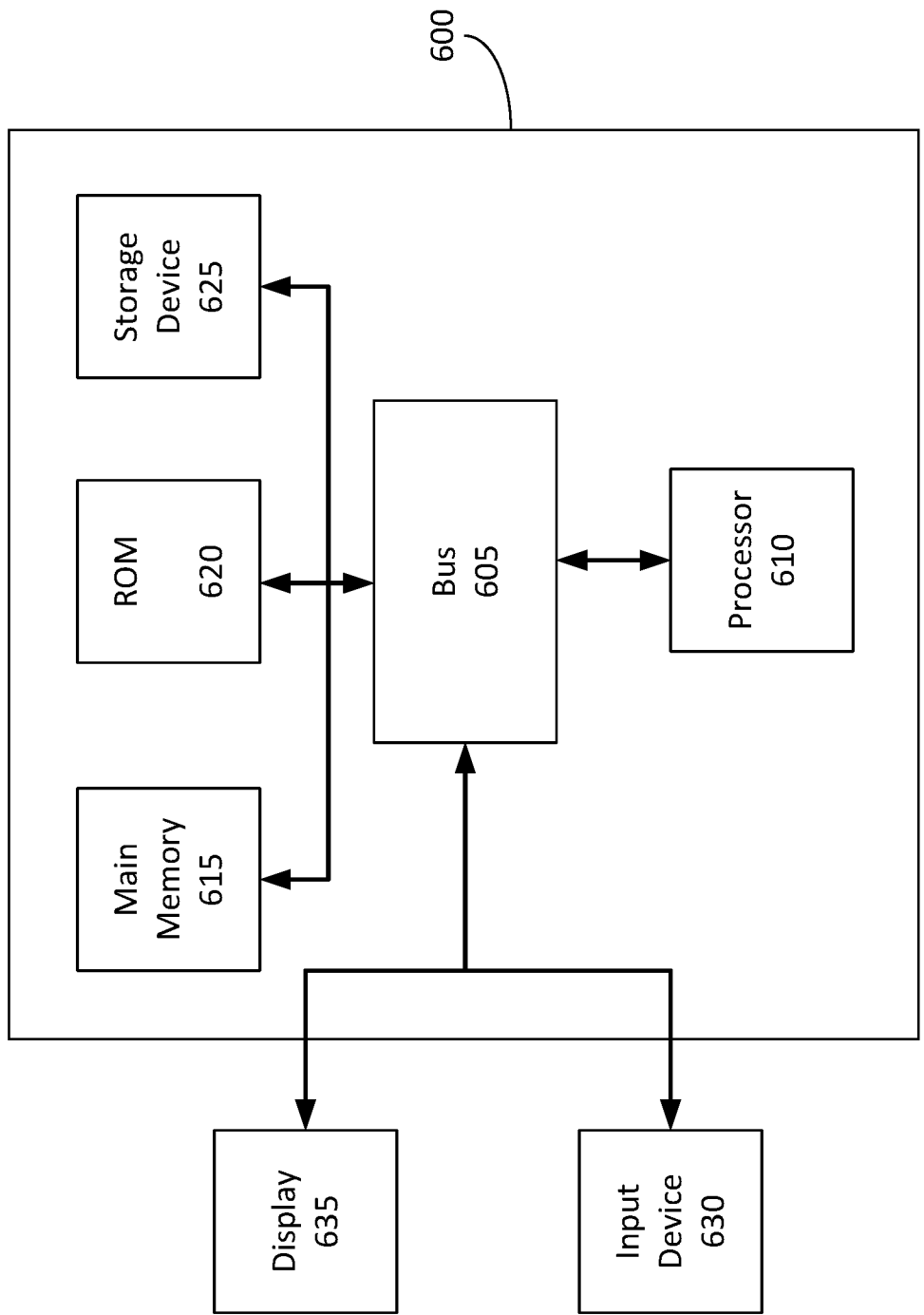
FIG. 6 is a block diagram illustrating a general architecture for a computer system that may be employed to implement various elements of the systems shown in FIGS. 1, 2A, 2B and 3, and methods shown in FIGS. 4 and 5 in accordance with an implementation.

FIG. 6 is a block diagram of a computer system 600 in accordance with an illustrative implementation. The computer system or computing device 600 can include or be used to implement the system 100, content provider 125, computing device 110, messaging system 115, data processing system 120, content selector component 130, link generation component 135, and data repository 140. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information, and instructions to be executed by the processor 610. The main memory 615 can be or include the data repository 155. The main memory 615 can also be used for storing position information, temporary variables, or other intermediate information during execution of instructions by the processor 610. The computing system 600 may further include a read only memory (ROM) 620 or other static storage device coupled to the bus 605 for storing static information and instructions for the processor 610. A storage device 625, such as a solid state device, magnetic disk or optical disk, is coupled to the bus 605 for persistently storing information and instructions. The storage device 625 can include or be part of the data repository 155.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information and command selections to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the computing device 110 or other component of FIG. 1, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to effect illustrative implementations. Thus, implementations are not limited to any specific combination of hardware circuitry and software.

Although an example computing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms. References to at least one of a list of elements can include any of a single element, more than one element, or all elements identified in the list.

Where technical features in the drawings, detailed description or any claim are followed by reference identifiers, the reference identifiers have been included to increase the intelligibility of the drawings, detailed description, or claims. Accordingly, neither the reference identifiers nor their absence have any limiting effect on the scope of any claim elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system to reduce latency in online communication infrastructure, comprising:
a data processing system comprising one or more processors and memory, wherein the data processing system is configured to:
receive, from a messaging application executed by a first computing device, a first one or more terms of a message to be delivered to a second computing device via the messaging application;
select a first plurality of content items based on and different from the first one or more terms, the first plurality of content items including a first highest ranking content item associated with a first-address;
receive, from the messaging application, subsequent to selecting the first plurality of content items, a second one or more terms of the message to be delivered to the second computing device via the messaging application, the second one or more terms input to the first computing device subsequent to the first one or more terms input to the computing device;
filter the first plurality of content items by:
selecting a second plurality of content items as a subset of the first plurality of content items based on and different from the first one or more terms, the second one or more terms, and data from an online selection auction process, the second plurality of content items including a second highest ranking content item associated with a second address;
replacing the selection of the first highest ranking content item with the selection of the second highest ranking content item based on both the first one or more terms and the second one or more terms; and
provide instructions to the messaging application executed by the first computing device to convert a term of the message to a hyperlink including the second address associated with the second highest ranking content item prior to transmission of the message from the first computing device to the second computing device via the messaging application, the hyperlink to be included in the message transmitted to the second computing device and pointing to the second address, thereby reducing latency over insertion of the second content item directly.

2. The system of claim 1, wherein the data processing system is further configured to:
receive, from the messaging application executed by the first computing device, a keyword comprising the first one or more terms of the message, the messaging application configured to parse the first one or more terms to generate the keyword; and
select the first plurality of content items responsive to generating the keyword.

3. The system of claim 1, wherein the data processing system is further configured to:
receive, from a filter component of the messaging application executed by the first computing device, the first one or more terms of the message, the messaging application configured to parse the message to remove a proper noun of the message prior to transmission of the first one or more terms to the data processing system; and
select the first plurality of content items responsive to receiving the first one or more terms, the first one or more terms excluding the proper noun.

4. The system of claim 1, wherein the data processing system is further configured to:
receive, from a filter component of the messaging application executed by the first computing device, the first one or more terms of the message, the messaging application configured to cross reference terms of the message with a repository of terms to remove a sensitive term of the message prior to transmission of the first one or more terms to the data processing system; and
select the first plurality of content items responsive to receiving the first one or more terms, the first one or more terms excluding the sensitive term.

5. The system of claim 1, wherein the data processing system is further configured to:
receive a data stream of a portion of the message comprising the first one or more terms as the first one or more terms are input into the first computing device; and
select the first plurality of content items using the portion of the data stream that is received from the first computing device.

6. The system of claim 1, wherein the messaging application executed by the first computing device is further configured to:
stream the message to the data processing system as terms of the message are input into the first computing device.

7. The system of claim 1, wherein the data processing system is further configured to:
retrieve, from a content data repository, a placement criteria for the content item, the placement criteria indicating a portion of the message in which to place the hyperlink for the content item; and
select the term of the message to convert to the hyperlink based on the portion of the message in which the term is positioned.

8. The system of claim 1, wherein the data processing system is further configured to:
stitch together the first one or more terms and the second one or more terms into a keyword;
generate a request for content for the keyword; and
select the second plurality of content items responsive to the request for content for the keyword.

9. The system of claim 1, wherein the data processing system is further configured to:
receive, from the messaging application, subsequent to selecting the second plurality of content items, a third one or more terms of the message to be delivered to the second computing device via the messaging application, the third one or more terms input to the first computing device subsequent to the second one or more terms input to the computing device;
stitch together the first one or more terms, the second one or more terms, and the third one or more terms into a keyword;
select a third content item responsive to stitching together the keyword; and provide, to the first computing device for input into the message delivered to the second computing device via the messaging application, instructions to convert a second term to a second hyperlink for the third content item.

10. The system of claim 1, wherein the data processing system is further configured to:
receive, from the messaging application, subsequent to selecting the second plurality of content items, a third one or more terms of the message to be delivered to the second computing device via the messaging application, the third one or more terms input to the first computing device subsequent to the second one or more terms input to the computing device;
select a third content item responsive to receiving the first one or more terms, the second one or more terms, and the third one or more terms;
retrieve, from a content data repository, a placement criteria for the third content item, the placement criteria indicating a portion of the message in which to place a second hyperlink for the third content item; and
determine not to provide instructions to convert a second term to the second hyperlink for the third content item based on the first term converted into the hyperlink being in the portion of the message.

11. A method of reducing latency in online communication infrastructure, comprising:
receiving, by a content selection component executed by a data processing system comprising one or more processors, from a messaging application executed by a first computing device, a first one or more terms of a message to be delivered to a second computing device via the messaging application;
selecting, by the data processing system, a first plurality of content items based on and different from the first one or more terms, the first plurality of content items including a first highest ranked content item associated with a first address;
receiving, by the data processing system from the messaging application, subsequent to selecting the first plurality of content items, a second one or more terms of the message to be delivered to the second computing device via the messaging application, the second one or more terms input to the first computing device subsequent to the first one or more terms input to the computing device;
filtering, by the data processing system, the first plurality of content items by:
selecting, by the data processing system, a second plurality of content items as a subset of the first plurality of content items based on and different from the first one or more terms, the second one or more terms, and data from an online selection auction process, the second plurality of content items including a second highest ranked content item associated with a second address;
replacing, by the data processing system, the selection of the first highest ranked content item with the selection of the second highest ranked content item based on both the first one or more terms and the second one or more terms; and
providing, by the data processing system, instructions to the messaging application executed by the first computing device to convert a term of the message to a hyperlink including the second address associated with the second highest ranked content item prior to the first computing device transmitting the message to the second computing device via the messaging application, the hyperlink included in the message transmitted to the second computing device and pointing to the second address, thereby reducing latency over insertion of the second content item directly.

12. The method of claim 11, further comprising:
receiving, by the data processing system, from the messaging application executed by the first computing device, a keyword comprising the first one or more terms of the message, the messaging application configured to parse the first one or more terms to generate the keyword; and
selecting, by the data processing system, the first content item responsive to generating the keyword.

13. The method of claim 11, further comprising:
receive, by the data processing system from a filter component of the messaging application executed by the first computing device, the first one or more terms of the message, the messaging application configured to parse the message to remove a proper noun of the message prior to transmission of the first one or more terms to the data processing system; and
selecting, by the data processing system, the first plurality of content items responsive to receiving the first one or more terms, the first one or more terms excluding the proper noun.

14. The method of claim 11, further comprising:
receiving, by the data processing system, from a filter component of the messaging application executed by the first computing device, the first one or more terms of the message, the messaging application configured to cross reference terms of the message with a repository of terms to remove a sensitive term of the message prior to transmission of the first one or more terms to the data processing system; and
selecting, by the data processing system, the first plurality of content items responsive to receiving the first one or more terms, the first one or more terms excluding the sensitive term.

15. The method of claim 11, further comprising:
receiving, by the data processing system, a data stream of a portion of the message comprising the first one or more terms as the first one or more terms are input into the first computing device; and
selecting, by the data processing system, the first plurality of content items using the portion of the data stream that is received from the first computing device.

16. The method of claim 11, further comprising:
streaming, by the messaging application, the message to the data processing system as terms of the message are input into the first computing device.

17. The method of claim 11, further comprising:
retrieving, by the data processing system from a content data repository, a placement criteria for the content item, the placement criteria indicating a portion of the message in which to place the hyperlink for the content item; and
selecting, by the data processing system, the term of the message to convert to the hyperlink based on the portion of the message in which the term is positioned.

18. The method of claim 11, further comprising:
assembling, by the data processing system, the first one or more terms and the second one or more terms into a keyword;
generating, by the data processing system, a request for content for the keyword; and selecting, by the data processing system, the second plurality of content items responsive to the request for content for the keyword.

19. The method of claim 11, further comprising:

receiving, by the data processing system, from the messaging application, subsequent to selecting the second plurality of content items, a third one or more terms of the message to be delivered to the second computing device via the messaging application, the third one or more terms input to the first computing device subsequent to the second one or more terms input to the computing device;

generating, by the data processing system, one or more keywords based on the first one or more terms, the second one or more terms, and the third one or more terms;

selecting, by the data processing system, a third content item responsive to stitching together the one or more keywords; and providing, by the data processing system, to the first computing device for input into the message delivered to the second computing device via the messaging application, instructions to convert a second term to a second hyperlink for the third content item.

20. The method of claim 11, further comprising:

receiving, by the data processing system, from the messaging application, subsequent to selecting the second plurality of content items, a third one or more terms of the message to be delivered to the second computing device via the messaging application, the third one or more terms input to the first computing device subsequent to the second one or more terms input to the computing device;

selecting, by the data processing system, a third content item responsive to receiving the first one or more terms, the second one or more terms, and the third one or more terms;

retrieving, by the data processing system, from a content data repository, a placement criteria for the third content item, the placement criteria indicating a portion of the message in which to place a second hyperlink for the third content item; and determining, by the data processing system, not to provide instructions to convert a second term to the second hyperlink for the third content item based on the first term converted into the hyperlink being in the portion of the message.

* * * * *